United States Patent Office 3,066,151
Patented Nov. 27, 1962

3,066,151
EPOXY ESTERS DERIVED FROM POLYCYCLOPENTADIENES
John P. Thorn, Union, William A. Dimler, Jr., Colonia, and James A. Gallagher, Cranford, N.J., assignors to Esso Research and Engineering Company, a corporation of Delaware
No Drawing. Filed Sept. 29, 1958, Ser. No. 763,815
3 Claims. (Cl. 260—348)

This invention relates to epoxidized polycyclopentadiene derivatives. More particularly, the invention relates to epoxidized polycyclopentadiene esters, which esters have been found to be especially useful plasticizers and stabilizers for synthetic resins.

Specifically, the invention provides a new class of polycyclopentadiene esters having an oxirane ring substituted for the residual ethylenic group in the polycyclopentadiene ring structure. An example of the new epoxy esters is a dicyclopentadiene ester epoxide having the formula:

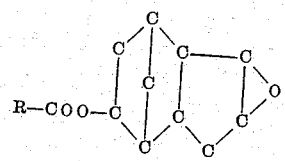

wherein R contains up to 25 carbon atoms, preferably 5 to 19 carbon atoms, and represents the carboxylic acid residue. R is advantageously an alkyl oxirane group.

Esters of the above types wherein the residual ethylenic group of the polycyclopentadiene structure has not been replaced by an oxirane ring are not desirable as plasticizers because of their incompatibility with synthetic resins such as vinyls. Also, such esters have proved to be inherently unstable under the deleterious influence of heat and light.

It is an object of this invention to provide a new class of polycyclopentadiene epoxy compounds. It is a further object to provide a new class of plasticizers which are compatible with synthetic resins. It is a more specific object to provide a new class of such plasticizers which render the resulting resin formulations highly stable under the influence of heat and light. It is still a further object to provide epoxy esters which may be used as stabilizing agents for synthetic resins. These and other objects will become more clearly apparent as the invention is described in detail below.

It has now been found that the above objects may be achieved by replacing the ethylenic group of a polycyclopentadiene ester by an epoxy group. This may be done by contacting the unsaturated ester with a peroxidizing agent such as hydrogen peroxide, peracetic acid, and the like. The structural features of the resulting epoxy esters render them more compatible with synthetic resins than the corresponding nonepoxidized esters, and more stable than other epoxy ester plasticizers and stabilizers.

The polycyclopentadienes from which the present esters may be derived include di-, tri-, tetra-cyclopentadienes and even higher polymers. Dicyclopentadiene and the $C_1$–$C_4$ alkyl substituted dicyclopentadienes are preferred. Especially preferred are dicyclopentadiene, methyl dicyclopentadiene, and dimethyl dicyclopentadiene.

The above polycyclopentadienes are reacted with aliphatic carboxylic acids to form the unsaturated polycyclopentadiene esters from which the product epoxy esters are prepared. The acids preferred include saturated and unsaturated monocarboxylic acids having 1 to 26, or more, carbon atoms. The $C_6$–$C_{20}$ acids are preferred. Examples of suitable saturated acids are formic, butyric, valeric, caproic, caprylic, capric, lauric, palmitic, stearic, cerotinic, etc. Examples of suitable unsaturated acids are crotonic, undecylenic, oleic, erucic, linoleic, linolenic, blends of unsaturated fatty acids from natural sources, e.g. castor oil, soybean oil, cocoanut oil, tall oil, etc.

The polycyclopentadienes may be reacted directly with the above acids to form the corresponding esters, as taught by H. A. Bruson in U.S. Patent 2,395,452; or the cyclodienes can first be hydrolyzed to the alcohol, as taught by Bruson in U.S. Patent 2,385,788, which alcohol is then reacted with the acids to form the esters. The latter method is preferred because it normally leads to higher yields of the esters.

The unsaturated esters of this type may be represented by the following formula:

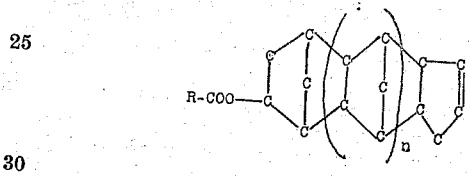

wherein $n$ is an integer between 0 and 2, RCOO— is the residue of an aliphatic carboxylic acid containing 1 to 26 or more carbon atoms. The acids of which R—COO— is a residue include both saturated and unsaturated acids. The acid esters wherein RCOO— contains 6 to 20 carbon atoms are preferred. The carbon valences not satisfied in the formula are satisfied by hydrogen or $C_1$–$C_4$ alkyl groups. The preferred esters are the dicyclopentadiene esters, i.e., where $n$ is 0.

For the direct esterification, the reaction temperature may vary over a wide range such as 25° to 145° C., depending on the specific reactants and catalyst employed. Above about 150° C., the dicyclopentadienes crack to the monomers. Preferably the reaction temperature is from 50° to 125° C. Unless the monobasic acid reactant is strong enough to catalyze its own reaction, an acid catalyst is necessary for the direct esterification. Suitable catalysts for this reaction include $AlCl_3$, $BF_3$, $H_2SO_4$, and other Lewis acids, e.g. acids capable of accepting a pair of electrons. $BF_3$ is preferred. The reactants are added in a ratio such that at least an equimolecular amount of the polycyclopentadiene is present. Preferably, the molar ratio of polycyclopentadiene to acid is between 1:1 and 2:1. Only the double bond of the endomethylene ring of the polycyclopentadiene is reacted, the remaining double bond remaining inactive. Diluents such as benzene, toluene, cyclohexene, cyclohexanone, etc., may be used for this esterification. The esters may be recovered by usual means such as distillation, etc.

When the polycyclopentadienes are hydrolyzed prior to esterification, the polycyclopentadiene is reacted with at least about an equimolecular amount of water in the presence of a mineral acid catalyst. Preferably about 2 to 20 moles of water, as part of a dilute sulfuric acid solution, e.g. 20–50% $H_2SO_4$, are reacted per mole of polycyclopentadiene. Again only the double bond of the endomethylene ring of the polycyclopentadienes is hydrolyzed, the remaining double bond remaining inactive. The hydrolysis temperature may vary from about 60° to 120° C., depending on the concentration of $H_2SO_4$. Preferably a reflux temperature of about 100°–110° C. is maintained. The resulting polycyclopentenyl alcohol may be recovered by conventional means, e.g. distillation, extraction, etc.

The cyclic alcohol is then esterified with the monocarboxylic acid in the conventional manner. At least an equimolecular amount of the alcohol is heated with the acid to a temperature varying from about 80° to 220° C. Preferably a molar ratio of alcohol to acid of 1:1 to 2:1, and an esterification temperature from 120° to 150° C. are employed.

Catalysts are not necessary for this esterification reaction, but may be used, if desired, to speed up the reaction. Suitable catalysts are sulfuric acid, p-toluene sulfonic acid, benzene sulfonic acid, phosphoric acid, etc. Entrainers or azeotrope agents such as benzene, toluene, hexane, heptane, etc. may also be used, or the excess alcohol in the reaction mixture may be used for entraining the water. The esters may be recovered by usual means, such as distillation, solvent extraction, etc.

The resulting cyclic esters all have a residual double bond located in the terminal cyclopentadiene ring. Normally this double bond is essentially inert, as evidenced by its inability to be hydrolyzed. The essence of this invention lies in the epoxidation of that residual double bond in order to form a compatible and more stable compound. Other double bonds located in the acid groups, occurring when an unsaturated acid is employed in preparing the ester, may also be epoxidized.

The epoxidation may be accomplished by reacting the unsaturated ester with a peroxidizing agent. The temperature of reaction may vary over the range of −30° C. to +100° C., but preferably the temperature is kept below room temperature, e.g. between about −10° C. and 20° C.

Suitable peroxidizing agents are hydrogen peroxide and the organic peracids, e.g. performic acid, peracetic acid, perbenzoic acid, monoperphthalic acid, etc. The reaction is essentially quantitative. The amount of peroxidizing agent employed may vary from about 1 to 2 moles per ethylenic group in the ester. Preferably, at least an equimolecular amount and not more than a slight excess of the peroxidizing agent is employed.

The resulting epoxy esters may be recovered by any convenient means such as distillation, extraction, etc. The epoxides are relatively high boiling liquids.

The epoxy esters of this invention are particularly valuable as plasticizers and stabilizers for synthetic resins. The unexpected epoxidation of the normally inactive double bond of the polycyclopentadiene esters has led to an epoxy ester which is compatible with vinyl and other resins. Furthermore, it is believed that the position of the epoxy group on the ring structure of the polycyclopentadiene ester is an important factor in the attainment of the high degree of stability in the present epoxy esters.

The synthetic resins in which the present epoxy esters are most useful are those which are unstable to heat and light. The vinyl-type resins, especially those having acid-forming elements, are representative of such unstable resins. The most important of these resins are polyvinyl chloride and copolymers of vinyl chloride with vinyl acetate, vinylidene chloride, ethyl maleate, etc.

The present epoxy esters may be used as plasticizers by themselves, as coplasticizers with other suitable plasticizers, or solely as stabilizers. When used as the sole plasticizer, the esters are employed in amounts varying from 25 to 75 parts by weight or more per 100 parts of resin. The same proportion of total plasticizer is generally used when the present esters are used as coplasticizers, with the latter generally comprising at least about 25% of the total plasticizer. As a stabilizer, about 0.1 to 10 parts by weight of the present esters are employed per 100 parts of resin. Other stabilizers, lubricants, pigments, clarifiers, HCl acceptors, and the like may be employed if desired.

The invention is further illustrated by the following examples, which are not intended to limit the scope of the invention.

EXAMPLE 1.—PREPARATION OF DICYCLOPENTADIENE OLEATE EPOXIDE

A. Oleic acid (282.5 g., 1.0 mole) was esterified with an excess (180 g., 1.2 moles) of hydroxydihydronordicyclopentadiene. (This alcohol is readily prepared from dicyclopentadiene.) Toluene (75 ml.) was the entrainer and toluene sulfonic acid (16 g., 4 wt. percent based on theoretical ester) was the catalyst. The reaction was run at 108°–115° C. for 1.5 hours until the theoretical amount of water (18 ml.) was azeotroped off. A minor portion (about 5 g.) of calcium hydroxide was added to precipitate any unreacted oleic acid as its calcium salt, which was filtered off. The reaction mixture was then washed with 5% caustic, then with salt water until neutral, and the excess alcohol was removed by distillation.

B. Sodium acetate (4.8 g., 0.06 mole) and the ester (124.2 g., 0.30 mole) were maintained at 25° C. for 35 minutes as an excess of peracetic acid (116.4 g. of a 40% solution) was added. The mixture was stirred two hours at 25° C. and one hour at 50° C. After washing until neutral and drying over $Na_2SO_4$, a 97% yield of the epoxidized ester was obtained. Titration for oxirane oxygen by HBr in glacial acetic acid showed about 1.5 oxirane groups per molecule. However, it is believed that this reagent is not capable of detecting all of the oxirane rings on the dicyclopentadiene ring. Thus it is believed that both the double bond in the ring and the double bond in the residual acid group were substantially completely epoxidized.

EXAMPLE 2.—DICYCLOPENTADIENE OLEATE EPOXIDE AS A PLASTICIZER IN POLYVINYL CHLORIDE

Polymer compositions were formulated according to the following recipe:

| Ingredient: | Parts by weight |
|---|---|
| Polyvinyl chloride | 100 |
| Plasticier | 50 |
| Ba-Cd phenate | 2 |
| Stearic acid | 0.5 |

The stearic acid serves as a lubricant, and the Ba-Cd phenate as an auxiliary stabilizer (HCl acceptor). Other auxiliary stabilizers and pigments may be added as long as the only variable in the runs is the plasticizer employed.

The test samples were prepared by mixing the above ingredients on an 8 x 16 in. mill for 5 minutes at 320° F. Sheets were calendered and cut into 6 by 6 in. slabs for molding. The molding procedure consisted of pressing the sheets in a mold at minimum pressure (e.g. 50–100 p.s.i.) for 10 min. at 320° F., and then at high pressure (e.g. 2100 p.s.i.) for 7 minutes at 320° F. and cooling the slab in the mold under pressure. Physical properties and color stability were determined on specimens 0.075 in. thick.

Four runs were made: one (Run A) in which the sole plasticizer was the commercially available didecyl phthalate (DDP); a second (Run B) in which the plasticizer consisted of 50% DDP and 50% of isooctyl oleate epoxide ($C_8$ oleate epoxide) which is a commercial resin plasticizer and stabilizer sold under the name of Celluflex 23; a third (Run C) in which the plasticizer consisted of 50% DDP and 50% of the dicyclopentadiene oleate (DCP oleate) prepared in part A of Example 1; and a fourth (Run D) in which the plasticizer consisted of 50% DDP and 50% of the dicyclopentadiene oleate epoxide (DCP oleate epoxide) prepared in part B of Example 1. The results are shown in Table I.

*Table I.—Dicyclopentadiene Oleate Epoxide as Plasticizer*

| Run | A | B | C | D |
|---|---|---|---|---|
| Plasticizer | DDP | DDP+ C₈ oleate epoxide | DDP+ DCP oleate | DDP+ DCP oleate epoxide |
| Original physical prop.: | | | | |
| Tensile strength, p.s.i. | 2,690 | 2,620 | (a) | 2,760 |
| Elongation, percent | 300 | 320 | | 320 |
| Volume resistivity, ohm-cm.×10⁻¹³ | 2.7 | 0.5 | | 3.6 |
| Physical prop. after aging (7 days at 212° F.): | | | | |
| Tensile strength, p.s.i. | 2,600 | 2,610 | | 2,710 |
| Elongation, percent | 265 | 305 | | 290 |
| Original color ¹ | 1 | 1 | | ² 5½ |
| Heat stability: ³ ⁴ | | | | |
| 45 min | 0 | 0 | | 0 |
| 60 min | 0+ | 0 | | 0 |
| 90 min | 4− | 0+ | | 0 |
| 120 min | 5 | 1 | | 1− |
| Light stability: ⁵ ⁶ | | | | |
| 300 hrs | 1 | 0 | | 0 |
| 500 hrs | 4 | 0 | | 0 |
| 700 hrs | 5 | 0 | | 0 |
| 1,000 hrs | | 5 | | 0+ |

ᵃ Incompatible.
¹ Gardner color.
² Original color due to dark color of the DCP oleate epoxide used; this epoxide has been obtained as a colorless product.
³ Heat stability determined by heating in forced-draft air oven at 177° C.
⁴ Heat stability scale based on degradation of color: 0=no color degradation; 1=slightly yellow; 2=yellow; 3=dark yellow; 4=dark orange; 5=dark brown or black.
⁵ Light stability determined by exposure to ultra violet light in a Fadometer; ASTM D-750-43-T.
⁶ Light stability scale based on degradation of color and appearance: 0=no degradation; 1=slightly yellow and/or slightly spotted; 2=yellow and/or moderately spotted; 3=dark yellow and/or black spots; 4=dark orange and/or almost entirely spotted; 5=black.

The data in Table I show that the dicyclopentadiene oleate epoxide is an excellent plasticizer in comparison with didecyl phthalate, isooctyl oleate epoxide, and the nonepoxidized dicyclopentadiene oleate. The latter is not even compatible with the polyvinyl chloride (Run C). The physical properties of the sample plasticized with the DCP oleate epoxide (Run D) compare favorably with the samples plasticized solely with DDP (Run A) or with DDP and C₈ oleate epoxide (Run B). At the same time, the heat stability and the light stability of the sample in Run D are greatly improved over Run A and slightly improved over Run B.

EXAMPLE 3.—DICYCLOPENTADIENE OLEATE EPOXIDE AS A STABILIZER IN POLYVINYL CHLORIDE

The polymer composition plasticized solely with DDP in Run A of Example 2 was compared with similar compositions containing a minor proportion of isooctyl oleate epoxide (Run E), dicyclopentadiene oleate (Run F), or dicyclopentadiene oleate epoxide (Run G) as stabilizers. These polymer samples were formulated in the same manner as in Example 2 according to the following recipe:

| Ingredient: | Parts by weight |
|---|---|
| Polyvinyl chloride | 100 |
| Didecl phthalate plasticizer | 45 |
| Stabilizer | 5 |
| Ba-Cd phenate | 2 |
| Stearic acid | 0.5 |

Other stabilizers, etc., may be added as long as the only variable in the runs is the stabilizer employed. The effect of the various stabilizers on the polymer upon exposure to heat and ultra violet light is shown in Table II.

*Table II.—Dicyclopentadiene Oleate Epoxide as Stabilizer*

| Run | A | E | F | G |
|---|---|---|---|---|
| Stabilizer | None | C₈ oleate epoxide | DCP oleate | DCP oleate epoxide |
| Original physical prop.: | | | | |
| Tensile strength, p.s.i. | 2,690 | 2,730 | 2,660 | 2,740 |
| Elongation, percent | 300 | 310 | 310 | 315 |
| Volume resistivity, ohm-cm.×10⁻¹³ | 2.7 | 2.9 | 2.8 | 2.4 |
| Physical prop. after aging, (7 days at 212° F.): | | | | |
| Tensile strength, p.s.i. | 2,600 | 2,650 | 2,520 | 2,640 |
| Elongation, percent | 265 | 295 | 280 | 295 |
| Original color ¹ | 1 | 1 | 1.5 | ² 2 |
| Heat stability: ³ ⁴ | | | | |
| 45 min | 0 | 0 | 0 | 0 |
| 60 min | 0+ | 0 | 1 | 0+ |
| 90 min | 4− | 1 | 4 | 1+ |
| 120 min | 5 | 2 | 5 | 3 |
| Light stability: ⁵ ⁶ | | | | |
| 300 hrs | 1 | 0 | 0 | 0 |
| 500 hrs | 4 | 0 | 0 | 0 |
| 700 hrs | 5 | 2+ | 2 | 0 |
| 1,000 hrs | | 5 | 5 | 5 |

See table I for footnotes 1 through 6.

Table II shows that where the available plasticizer is satisfactory from most standpoints, the present epoxy esters may be used in minor amounts as heat and/or light stabilizers. In this respect, the present epoxy esters appear to be superior to other monomeric epoxy compounds such as isooctyl epoxystearate. For example, the polyvinyl chlorides containing the isooctyl oleate epoxide (Run E) discolored more rapidly upon exposure to both heat and light than the samples stabilized with the present DCP oleate epoxide (Run G). The non-epoxidized DCP oleate (Run F) is compatible in small amounts as a stabilizer, but a comparison with Run G shows that the epoxy groups in the novel epoxy esters have led to better stabilizing properties.

Having set forth the general nature and several specific embodiments of the present invention, the true scope is now particularly pointed out in the appended claims.

What is claimed is:
1. An epoxy ester having the formula

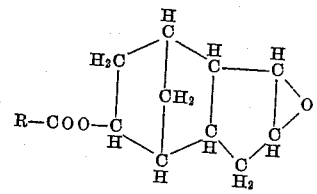

wherein R is an alkyl oxirane group containing up to 25 carbon atoms.

2. An epoxy ester having the formula

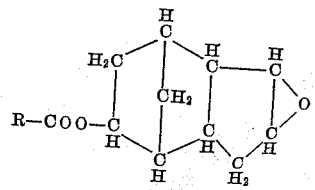

wherein R is an alkyl oxirane group containing 5 to 19 carbon atoms.

3. An epoxy ester having the formula
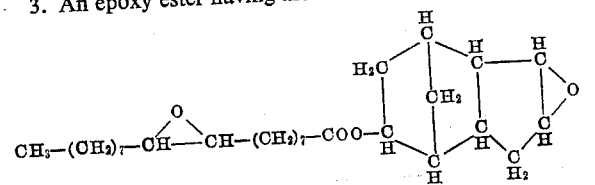
References Cited in the file of this patent
UNITED STATES PATENTS
| | | |
|---|---|---|
| 2,543,419 | Niederhauser | Feb. 27, 1951 |
| 2,687,389 | Dazzi | Aug. 24, 1954 |
| 2,723,247 | Harrington | Nov. 8, 1955 |
| 2,786,066 | Frostick et al. | Mar. 19, 1957 |
| 2,794,030 | Phillips et al. | May 28, 1957 |
| 2,794,812 | Phillips et al. | June 4, 1957 |

Notice of Adverse Decision in Interference

In Interference No. 94,462 involving Patent No. 3,066,151, J. P. Thorn, W. A. Dimler, Jr., and J. A. Gallagher, EPOXY ESTERS DERIVED FROM POLYCYCLOPENTADIENES, final judgment adverse to the patentees was rendered Sept. 14, 1965, as to claims 1, 2 and 3.

[*Official Gazette December 14, 1965.*]